United States Patent
Jaiswal et al.

(10) Patent No.: US 11,775,617 B1
(45) Date of Patent: Oct. 3, 2023

(54) CLASS-AGNOSTIC OBJECT DETECTION

(71) Applicant: Amazon Technologies, Inc., Seattle, WA (US)

(72) Inventors: Ayush Jaiswal, Manhattan Beach, CA (US); Yue Wu, Torrance, CA (US); Pradeep Natarajan, Chicago, IL (US); Premkumar Natarajan, Rolling Hills Estates, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 227 days.

(21) Appl. No.: 17/201,358

(22) Filed: Mar. 15, 2021

(51) Int. Cl.
*G06K 9/00* (2022.01)
*G06F 18/2413* (2023.01)
*G06F 16/53* (2019.01)
*G06F 40/20* (2020.01)
*G06V 10/40* (2022.01)
*G06F 18/22* (2023.01)
*G06F 18/2132* (2023.01)

(52) U.S. Cl.
CPC .......... *G06F 18/2413* (2023.01); *G06F 16/53* (2019.01); *G06F 18/2132* (2023.01); *G06F 18/22* (2023.01); *G06F 40/20* (2020.01); *G06V 10/40* (2022.01)

(58) Field of Classification Search
CPC .... G06K 9/627; G06K 9/6215; G06K 9/6234; G06F 16/53; G06F 40/20; G06V 10/40
See application file for complete search history.

(56) References Cited

U.S. PATENT DOCUMENTS

| | | | |
|---|---|---|---|
| 9,129,191 B2 * | 9/2015 | Cohen | G06T 7/143 |
| 9,996,890 B1 * | 6/2018 | Cinnamon | G06V 10/764 |
| 10,452,959 B1 * | 10/2019 | Gautam | G06N 3/02 |
| 10,592,767 B2 * | 3/2020 | Trott | G06F 18/00 |
| 11,048,977 B1 * | 6/2021 | Ulbricht | G06V 10/98 |
| 2011/0128558 A1 * | 6/2011 | Stevens | G06F 16/90332 358/1.9 |

(Continued)

FOREIGN PATENT DOCUMENTS

| | | | | |
|---|---|---|---|---|
| CN | 108665506 A | * | 10/2018 | G06K 9/46 |
| EP | 2299374 A1 | * | 3/2011 | G06F 16/5854 |

(Continued)

OTHER PUBLICATIONS

Spatio-temporal Person Retrieval via Natural Language Queries, Masataka Yamaguchi et al., arXiv, Aug. 22, 2017, pp. 1-10 (Year: 2017).*

(Continued)

*Primary Examiner* — Jayesh A Patel
(74) *Attorney, Agent, or Firm* — K&L Gates LLP

(57) ABSTRACT

Devices and techniques are generally described for class-agnostic object detection. In some examples, a first frame of image data comprising a first plurality of pixels may be received. First class-agnostic feature data representing the first plurality of pixels may be generated. A first object detection component may be used to determine that the first plurality of pixels corresponds to an arbitrary object represented in the first frame of image data based at least in part on the first class-agnostic feature data. Class-agnostic data indicating that the first plurality of pixels in the first frame of image data corresponds to the arbitrary object may be generated.

17 Claims, 8 Drawing Sheets

(56) References Cited

U.S. PATENT DOCUMENTS

| | | | | |
|---|---|---|---|---|
| 2015/0120726 | A1* | 4/2015 | Jain | G06F 16/7834 |
| | | | | 707/736 |
| 2015/0242708 | A1* | 8/2015 | Duan | G06V 10/50 |
| | | | | 382/159 |
| 2018/0121763 | A1* | 5/2018 | Surnilla | G06V 10/809 |
| 2018/0129742 | A1* | 5/2018 | Li | G06N 3/044 |
| 2018/0285682 | A1* | 10/2018 | Najibi | G06T 7/194 |
| 2019/0095465 | A1* | 3/2019 | Zhai | G06F 16/532 |
| 2019/0204834 | A1* | 7/2019 | Harrison | G01S 13/867 |
| 2019/0286937 | A1* | 9/2019 | Katoh | G06N 3/084 |
| 2020/0026949 | A1* | 1/2020 | Alcock | G06F 16/532 |
| 2020/0134377 | A1* | 4/2020 | Attorre | G06V 10/82 |
| 2020/0160042 | A1* | 5/2020 | Bui | G06V 10/764 |
| 2021/0056458 | A1* | 2/2021 | Savova | G06N 20/00 |
| 2021/0081728 | A1* | 3/2021 | Lai | G06N 3/045 |
| 2021/0319420 | A1* | 10/2021 | Yu | G06V 20/52 |
| 2021/0319426 | A1* | 10/2021 | DeSoto | G06Q 20/3276 |
| 2022/0230321 | A1* | 7/2022 | Zhao | G06T 5/004 |
| 2022/0277039 | A1* | 9/2022 | Aggarwal | G06F 40/279 |

FOREIGN PATENT DOCUMENTS

| | | | | |
|---|---|---|---|---|
| EP | | 3985551 A1 * | 4/2022 | |
| KR | | 20170030297 A1 * | 3/2017 | |
| WO | WO-2020069379 A1 * | 4/2020 | | B25J 13/003 |

OTHER PUBLICATIONS

An End-to-End Approach to Natural Language Object Retrieval via Context-Aware Deep Reinforcement Learning, Fan Wu et al., arXiv, Mar. 22, 2017, pp. 1-10 (Year: 2017).*

Zhou et al.; Objects as Points; Apr. 25, 2019; 12 pgs; Cornell University.

* cited by examiner

CLASS-AGNOSTIC OBJECT DETECTION

BACKGROUND

Object detection refers to a computer vision technique whereby semantic objects of a certain class (e.g., humans, dogs, cars, etc.) may be detected in input images and/or frames of video. Object detection has a wide variety of use cases such as diagnosing medical conditions, face recognition, object segmentation, object tracking, activity recognition, image annotation, etc. Deep learning-based object detection models are trained using large datasets of annotated images that include identification of an objects location (e.g., via a bounding box) and a class label indicating a type of the object.

DETAILED DESCRIPTION

Figure 1:
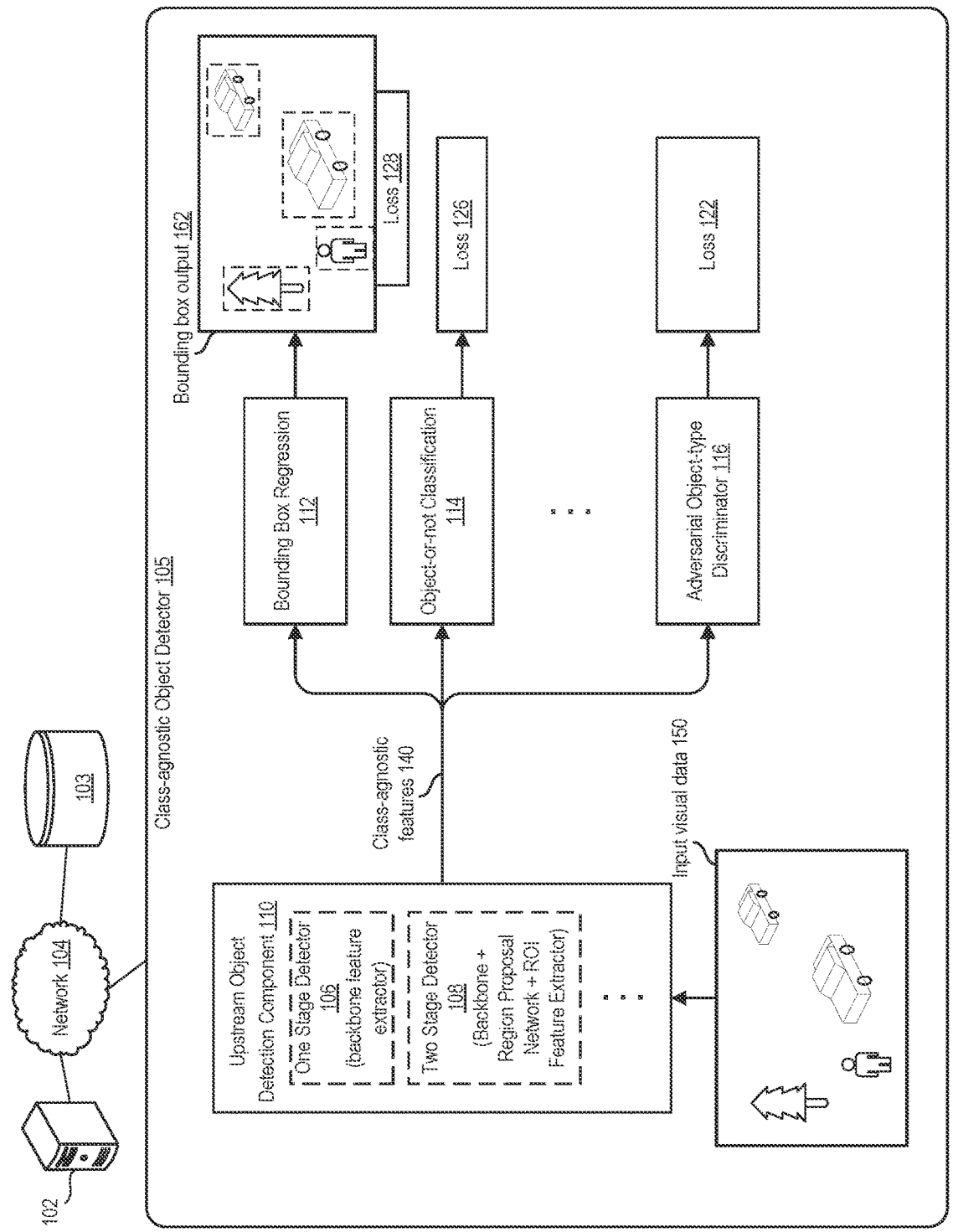
FIG. 1 is a block diagram illustrating a class-agnostic object detector, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Object detection models (e.g., machine learned, rule-based, and/or other types of models) perform well at localizing and classifying objects. For example, machine learned models can localize and/or classify objects similar to or the same as objects that the models are trained using. However, some trained models can detect only a limited number of object types with unknown objects being treated as background content. Such an architecture can hinder the adoption of conventional object detectors in real-world applications like large-scale object matching, visual grounding, visual relation prediction, obstacle detection (where it is more important to determine the presence and location of objects than to determine the specific object types), etc. Described herein are approaches for class-agnostic object detection that focus on detecting objects irrespective of objects' types. In various examples, the goal of such class-agnostic object detectors is to predict bounding boxes (and/or other object location data) for all objects in an image without predicting object classes. The predicted object locations (e.g., bounding boxes and/or segmentation masks) may then be consumed by various other systems to perform application-specific classifications, retrieval, etc. In various examples described herein, an adversarial learning framework for class-agnostic object detection is described. The adversarial learning framework forces the model to exclude class-specific information from features used for predictions. The adversarial learning techniques described herein improves class-agnostic object detection efficacy relative to previous approaches.

The object detection task may be formulated as the prediction of bounding boxes (or other data identifying the location of objects within a frame) and classes for objects in a given frame of image data. Object detection models can use densely-labeled data that contains annotations for all objects in training images. Additional detection classes require additional training samples that provide examples of that object class. Creating such datasets can be technically challenging, time consuming, and expensive. Object detection focuses on the reduced task of locating and recognizing "objects of interest" corresponding to limited types of objects that are labeled in the training data, with objects of unknown types treated as background content.

To improve the state of the art and address the various limitations of conventional class-aware detection, described herein are various systems and techniques for, among other things, class-agnostic object detection that detects the location of all objects present in an image irrespective of their object-types (referred to herein as an object's "class"). Intuitively, this task additionally seeks to detect objects of unknown types, which are not present or annotated in the training data. This challenging yet high-reward goal of generalization to unseen object types is beneficial to downstream applications (e.g., application-specific object classification, visual search (object retrieval from large databases), computer vision-based speech processing, etc.) that can use such class-agnostic detections as inputs.

Described herein are various systems and techniques for implementing class-agnostic object detectors. For example, region proposals of two-stage detectors, pre-trained class-aware models used as-is (or fine-tuned for binary object-or-not classification), and detection models trained from scratch for such a binary classification (e.g., a binary prediction of object-or-not) may all be optionally used in accordance with the various techniques described herein. A new adversarial training framework is described that forces the object detection model(s) to exclude class-specific information from the features used for making predictions (e.g., object class predictions). Stated another way, the adversarial learning framework works well for class-agnostic object detection, as it penalizes the object detection model for encoding class-specific information in the embeddings/features used for object detection.

In various examples, class-agnostic object detection may be used in multi-modal natural language processing systems. For example, if the location of all objects in a scene (e.g., in a frame of image data input into a natural language processing system) is known to a natural language processing system, the system may use such information to determine information about and/or perform various action related to the detected objects. For example, a multi-modal natural language processing enabled device may have a camera and a display (among other hardware). The camera may capture images of a user's environment that may, in turn, be shown on a portion of the display. The various class-agnostic object detection techniques described herein may be used to detect objects within frames of image data captured by the camera. In some examples, data representing the detected objects (e.g., bounding box data and/or class-agnostic feature data representing the objects) may be used as an input to a natural language understanding (NLU) system and may be used in conjunction with natural language inputs to perform various tasks. For example, a user may say "Computer, where can I buy this red hat?" The multi-modal NLU system may be effective to determine that one of the detected objects is likely to correspond to the red hat that is the subject of the user's spoken request. The natural language processing system may thereafter instigate a visual search for similar items, as described in further detail below. It should be appreciated that this is but one possible use case for the class-agnostic object detection systems described herein.

Various components of a natural language processing system are introduced below. Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable commands or other type of instructions. In some examples, NLU processes may take both natural language (e.g., text, speech, and/or data representations of speech) and image data as inputs (e.g., a multi-modal NLU process) in order to determine a semantic interpretation of the natural language input and/or image. Text-to-speech (TTS) is a field of computer science, artificial intelligence, and linguistics concerned with enabling computers to output synthesized speech. ASR, NLU, and TTS may be used together as part of a speech processing system. As used in, natural language input data may comprise audio data (e.g., representing a user request or command), text data, and/or other representation data representing natural language for input into a natural language processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a speech processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during speech processing to take an action in response to input request data (e.g., natural language inputs such as user utterances and/or text). Such applications may include speech processing skills, speechlets, and/or other types of speech processing software.

The various techniques described herein and speech processing generally may be used in a variety of contexts, including in speech processing enabled devices (e.g., devices employing voice control and/or speech processing "voice assistants") and/or systems. Examples of speech processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., the Alexa system from Amazon.com, Inc. of Seattle, Wash., etc.

Speech processing enabled devices may include one or more microphones (e.g., far-field microphone arrays) used to transform audio into electrical signals. Speech processing may then be performed, locally by the speech processing enabled device, by one or more other computing devices communicating with the speech processing enabled device over a network, and/or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

A speech-controlled computing system may respond to user request data by outputting content and/or performing one or more other actions, such as initiating communications (e.g., synchronous phone/video calls and/or asynchronous messaging), answering questions, playing music, providing information, calling a taxi, displaying an image, controlling other devices, etc. Generally, input data received by the various speech processing systems and components described herein may comprise natural language input data. Natural language input data may be in the form of audio data representing spoken user request data (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

FIG. 1 is a block diagram illustrating a class-agnostic object detector 105, according to various embodiments of the present disclosure. In various examples, the class-agnostic object detector 105 may be implemented by one or more computing devices 102. The computing devices 102 may include at least one processor and may be configured in communication with non-transitory computer-readable memory 103 (e.g., locally or over a network 104). The non-transitory computer-readable memory 103 may store instructions that, when executed by the at least one processor of the one or more computing devices 102 may execute the various models and/or perform the various class-agnostic object detection techniques described herein. Network 104 may be a communications network such as a local area network (LAN) and/or a wide area network (WAN) such as the Internet.

Class-agnostic object detector 105 may comprise an upstream object detection component 110. The upstream object detection component 110 may be a baseline object detection model with the various modifications and/or trained according to the class-agnostic object detection techniques described below. In general the upstream object detection component 110 may include convolutional layers that are configured to learn features semantically representing portions of the image data. For example, the object detection component 110 may be some form of convolutional neural network (CNN) and/or recurrent convolutional network (R-CNN). The upstream object detection component 110 may be implemented in various forms. For example, the upstream object detection component 110 may be a region proposal network of a two-stage detector 108, a class-aware detector initially trained for object-type classification and bounding box regression, a pre-trained class-aware model fine-tuned end-to-end for object-or-not binary classification instead of object-type along with bounding box regression, a detection model initially trained for object-or-not binary classification and bounding box regression, etc.

Conventional class-aware detection focuses on detecting "objects of interest," which inherently requires models to be able to distinguish between types of objects in a closed known set. Intuitively, models achieve this by encoding features that are discriminative of object-classes. However, for class-agnostic detection and for models to be able to detect previously-unseen classes of objects, detectors should encode class-agnostic features 140 that more effectively distinguish objects from background content and individual objects from other objects in the image (e.g., input visual data 150), without discriminating between object-classes. Although visual data 150 may be a two-dimensional frame of image data in some cases; in other examples, visual data 150 may be three-dimensional visual data (e.g., a point cloud, lidar cloud, etc.).

Training conventional object detectors for the binary classification task of object-or-not together with bounding box regression 112 may not be sufficient to ensure that models focus on class-agnostic features 140. Further, conventional object detectors trained for the binary classification task of object-or-not may learn type-distinguishing features making it difficult for such models to generalize to unseen object-classes. In order to overcome this problem, the upstream object detection component 110 (e.g., a one stage detector 106, two stage detector 108, DRAFT) is trained in an adversarial fashion using adversarial object-type discriminator 116 (e.g., a discriminator network) such that the models of the upstream object detection component 110 are penalized for encoding features that contain object-class information.

A popular two-part pattern in the model design of both one-stage and two-stage object detectors is an upstream object detection component 110 that learns a set of convolutional features from entire input images (in a one stage detector 106 example) or in region proposals (regions-of-interest) in a two stage detector 108 example. The second, downstream part of an object detector consumes these features as input and passes them through classification and regression branches for object-class and bounding box prediction, respectively. This two-part setup allows for external control on the information output by the upstream object detection stage, which are then consumed by the second stage. In the examples described herein, class-agnostic object detector 105 is augmented with adversarial object-type discriminator 116 branches that attempt to classify object-types (e.g., as annotated in the training data) from the features output by the upstream object detection component 110. In the examples described herein, the various object detection models are penalized if the adversarial object-type discriminator 116 is successful in predicted an object's class. The models are trained in an alternating manner such that the adversarial object-type discriminator 116 is frozen (e.g., the weights/parameters of the models are maintained during training iterations) when the rest of the model is updated (e.g., when weights of the other models are updated) and vice versa. In various examples, categorical cross-entropy loss with object classes used as prediction targets is used to update the adversarial object-type discriminator 116. On the other hand, while training the rest of the model, (a) the cross-entropy loss is minimized for object-or-not classification 114, (b) smooth $L_1$ loss is minimized for bounding box regression 112, and (c) negative entropy of discriminator predictions is minimized. The various losses described herein may be used as feedback data (e.g., a feedback signal) that may be back-propagated to the other models and used to update parameters of the other models (e.g., the upstream object detection component 110).

This entropy maximization forces the upstream object detection component 110 to exclude object-type information from the features it outputs. In other words, this forces the upstream object detection component 110 to generate class-agnostic features 140. The adversarial object-type discriminator 116 may be updated multiple times (e.g., five times) for every update to the rest of the model and the negative entropy may be weighted with a multiplier a (tuned on 0.1, 1) in the overall objective. Each update of models of upstream object detection component 110 may result in modified class-agnostic features 140.

During test-time inference, the adversarial object-type discriminator 116 are detached from the model, giving back the original network with the standard layers and parameter-count. Thus, the example framework depicted in FIG. 1 does not cause performance delays.

The example depicted in FIG. 1 depicts the proposed adversarial framework applied to both a two stage detector 108 (e.g., Faster R-CNN (FRCNN)), and a one stage detector 106 (e.g., an SSD). Any traditional training dataset that includes class annotations for objects may be used. In some examples, multiple versions of the adversarial object-type discriminator 116 (or any other discriminator network) may be used. For example, one version may be trained from scratch (e.g., from an untrained, initialized model) and the other may be fine-tuned from a pre-trained baseline class-aware model.

In the two stage detector 108 example, an FRCNN model (or other two stage detector) may generate regions-of-interest (e.g., region proposals) in the input image. Next the features may be extracted from the layers of the upstream portion of the two stage detector 108. Thereafter, bounding box regression 112 may be used to predict bounding box output 162 and object-or-not classification 114 may predict, for each bounding box, whether the bounding box corresponds to an object or background. Bounding box regression 112 may Although bounding boxes are described in many examples herein, other data may be used to detect the location of objects in a frame of image data (e.g., a segmentation mask, etc.) A class-agnostic adversarial version of a traditional FRCNN may be generated by (1) replacing the multi-class object-type classification layer with the binary object-or-not classification 114 layer, and (2) attaching the adversarial object-type discriminator 116 on top of the feature extraction layer of the two stage detector 108 that provides inputs to the classification and regression heads. Thus, during training, this feature layer serves three prediction heads (e.g., bounding box regression 112, object-or-not classification 114, and the adversarial object-type discriminator 116) instead of the standard two. In one possible example implementation, the FRCNN model available in MMDetection may be used. This model includes a ResNet-50 backbone and a Feature Pyramid Network.

Examples of the various loss functions are provided below; although different loss functions apart from those specifically described may be used in accordance with the class-agnostic object detector 105. As previously described, loss 128 may be binary cross-entropy loss related to the difference between ground truth bounding boxes and the bounding boxes predicted by bounding box regression 112, IoU loss, $L_2$ loss, etc. Loss 126 may be smooth $L_1$ loss, $L_2$ loss, focal loss, etc., based on whether the object-or-not classification 114 output is correct or not.

Attempts to classify object types (annotated in the training data) from the features 140 output by upstream object detection component 110. The models may be trained in an alternating manner such that the adversarial object-type discriminator 116 is frozen (e.g., weights are maintained) while the other models (e.g., upstream object detection component 110, bounding box regression 112, and object-or-not classification 114) are updated, and the other model weights are frozen while the adversarial object type discriminator 116 is updated. As previously described, in some examples, it may be advantageous to update the adversarial object-type discriminator 116 multiple times (e.g., 5 times) for every single update of the rest of the model (e.g., upstream object detection component 110, bounding box regression component 112, and object-or-not classification component 114).

In at least some examples, categorical cross-entropy loss with object types used as prediction targets may be used to update adversarial object-type discriminator 116 (e.g., loss 122). The rest of the class-agnostic object detector 105 (e.g., upstream object detection component 110, bounding box regression component 112, and object-or-not classification component 114) may be trained by minimizing (a) the cross-entropy loss for object-or-not classification (e.g., loss 126), (b) smooth $L_1$ loss for bounding box regression (e.g., loss 128), and (c) the negative categorical cross-entropy loss of the adversarial object-type discriminator 116. In various examples, this entropy maximization forces the upstream detection models to learn class-agnostic features 140 that are not specific to any particular object class.

In various other examples, the upstream object detection component 110 may be implemented as a one stage detector. For example, the upstream object detection component 110 may be implemented as an SSD. An SSD model utilizes features from several layers of its backbone network (e.g., convolutional layers) to detect objects of different scales, corresponding to the depth-levels of the backbone layers. Specifically, SSD models include classification and regression layers for making predictions at each depth-level. In order to create a class-agnostic adversarial version of the SSD model, (1) each object-type classification layer may be replaced with a binary object-or-not classification 114 layer, and (2) an adversarial object-type discriminator 116 may be connected at each depth-level where predictions are made. Thus, during training, each prediction level in the resulting model may have three prediction heads (bounding box regression 112, object-or-not classification 114, and adversarial object-type discriminator 116) instead of the conventional two. In one possible example implementation, the standard 300-layer SSD with VGG-16 pre-trained on ImageNet may be used as the upstream object detection component 110 backbone. Various different models and/or algorithms may be used for bounding box regression 112. For example, anchor-based models and/or anchor free models may be used in accordance with the desired implementation. Additionally, various other bounding box related tasks may be included in addition to those shown in FIG. 1. For example, in addition to bounding box regression 112, and/or object-or-not classification 114, 3D bounding box prediction, keypoint regression (e.g., center point regression), etc.

Object detection component 110 may also be implemented as other types of detectors and/or feature extraction networks. For example, the object detection component 110 may be implemented as a contextual object detector effective to take multiple frames of image data as input (e.g., video as input). Accordingly, in examples where object detection component 110 is a contextual object detector, input visual data 150 may be a video (e.g., multiple frames of image data).

Figure 2:
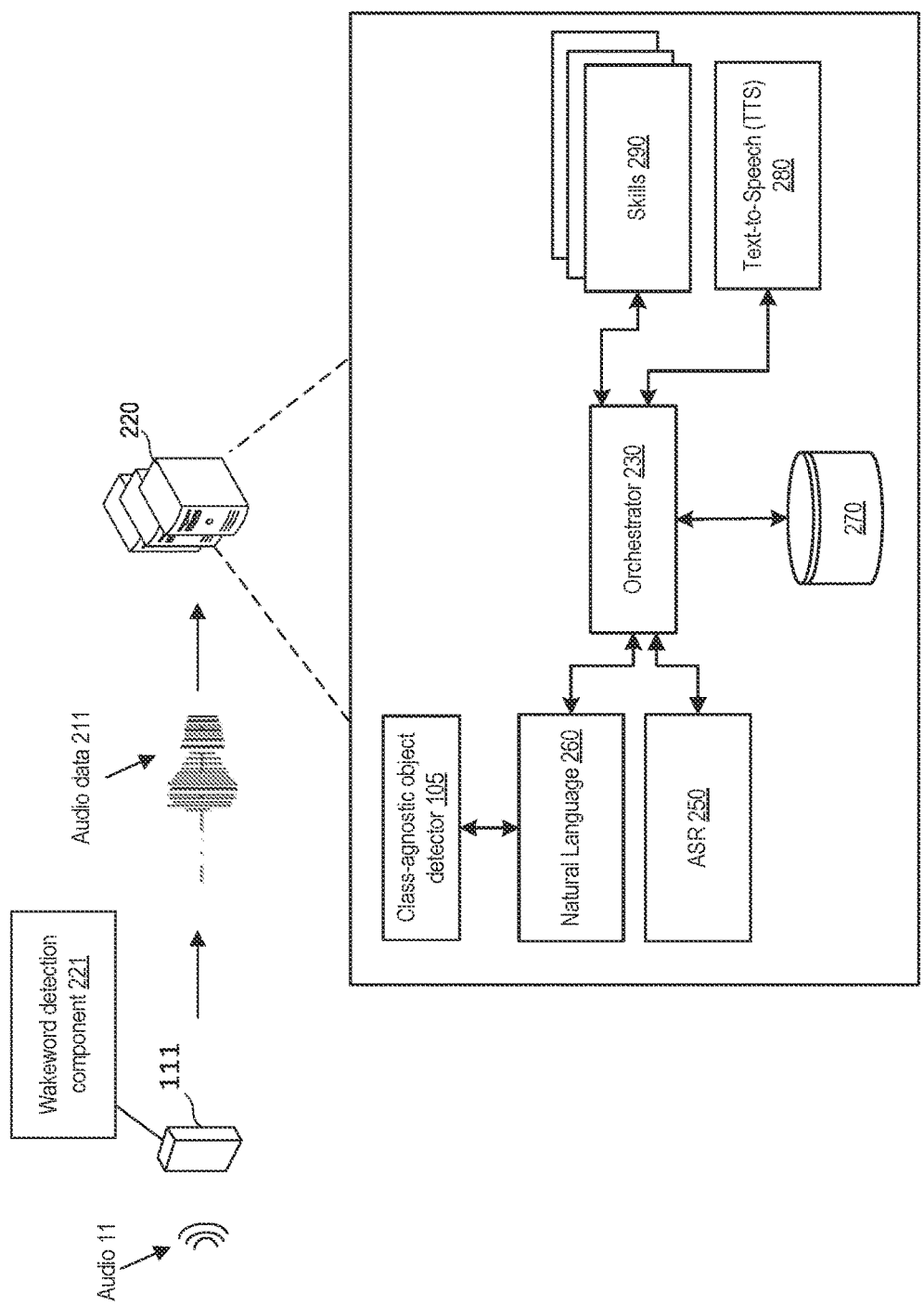
FIG. 2 is a block diagram of an example natural language processing system that may be used in accordance with various aspects of the present disclosure.

FIG. 2 is a block diagram of an example natural language processing system 220 that may be used in accordance with various aspects of the present disclosure. Although not necessarily limited to such, the system may operate using various natural language processing components as described in FIG. 2. The various components may be located on same or different physical devices. Communication between various components may occur directly or across a network(s). In various examples, the natural language processing system 220 may include and/or be configured in communication with a class-agnostic object detector 105. The class-agnostic object detector 105 may be used as an input to a multi-modal NLU 260 system and/or may be part of a multi-modal NLU 260 system. The detection of class-agnostic objects may be used to provide context to the natural language processing system 220 and may aid in the processing of the natural language inputs thereto.

An audio capture component(s), such as a microphone or array of microphones of the device 111, captures audio data 11. The device 111 processes audio data, representing the audio data 11, to determine whether speech is detected. The device 111 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 111 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio data 11, the device 111 may use a wakeword detection component 221 to perform wakeword detection to determine when a user intends to speak an input to the device 111. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio data 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 220 and/or may be provided by the user.

The wakeword detection component 221 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 111 may wake and begin transmitting audio data 211, representing the audio data 11, to the natural language processing system 220. The audio data 211 may include data corresponding to the wakeword, or the portion of the audio data 211 corresponding to the wakeword may be removed by the device 111 prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

In some examples, the orchestrator component 230 may receive output from the class-agnostic object detector 105 and may provide such data to the NLU component 260. In other examples, the output from the class-agnostic object detector 105 may be directly ingested by the NLU component 260. In various examples, the NLU component 260 may include models (e.g., CNNs, R-CNNs, transformer-based models, etc.) that may be used to determine semantic information regarding the objects detected in the output of the class-agnostic object detector 105. For example, colors, object classes, size, movement speed, etc., may be determined. In some examples, feature data representing such semantic information may be processed along with feature data semantically representing a natural language input (e.g., user speech) such that correlations may be determined. For example, the NLU component 260 may include a classifier network (e.g., an object classifier component) effective to classify different objects detected by the class-agnostic object detector 105. In an example, a user may say, "Computer, what model car is that?" The output of the class-agnostic object detector 105 may identify an object that is determined by an object classifier of the NLU component 260 to be image data representing a car. NLU component 260 (or another component) may perform a visual search using the image data determined to be a car to determine a model of the car. TTS 280 may be used to output audio data relaying the model information to the user.

In general, the NLU component 260 attempts to make a semantic interpretation of the phrases or statements represented in the text data input therein. In a multi-modal implementation, the NLU component 260 may also be effective to determine semantic information about various objects detected in an image (e.g., in the output of class-agnostic object detector 105). That is, the NLU component 260 determines one or more meanings associated with the phrases or statements represented in the text data based on words represented in the text data. Similarly, the NLU component 260 may determine information about the content of an image. The NLU component 260 determines an intent (e.g., intent data) representing an action that a user desires be performed as well as pieces of the input text data that allow a device (e.g., the device 111, the natural language processing system 220, etc.) to execute the intent. For example, if the text data corresponds to "call John," the NLU component 260 may determine an intent that the system establish a two-way communication channel between the device 111 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 111 or a gateway system in order to complete certain functions. Inputs to a skill component 290 may come from various interactions and input sources. A skill component may include a communications skill 290a which may correspond to a service for performing media processing that may be operated, for example, by a media processing unit (MPU) as discussed below.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 111.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 111, or other devices discussed herein.

Figure 3:
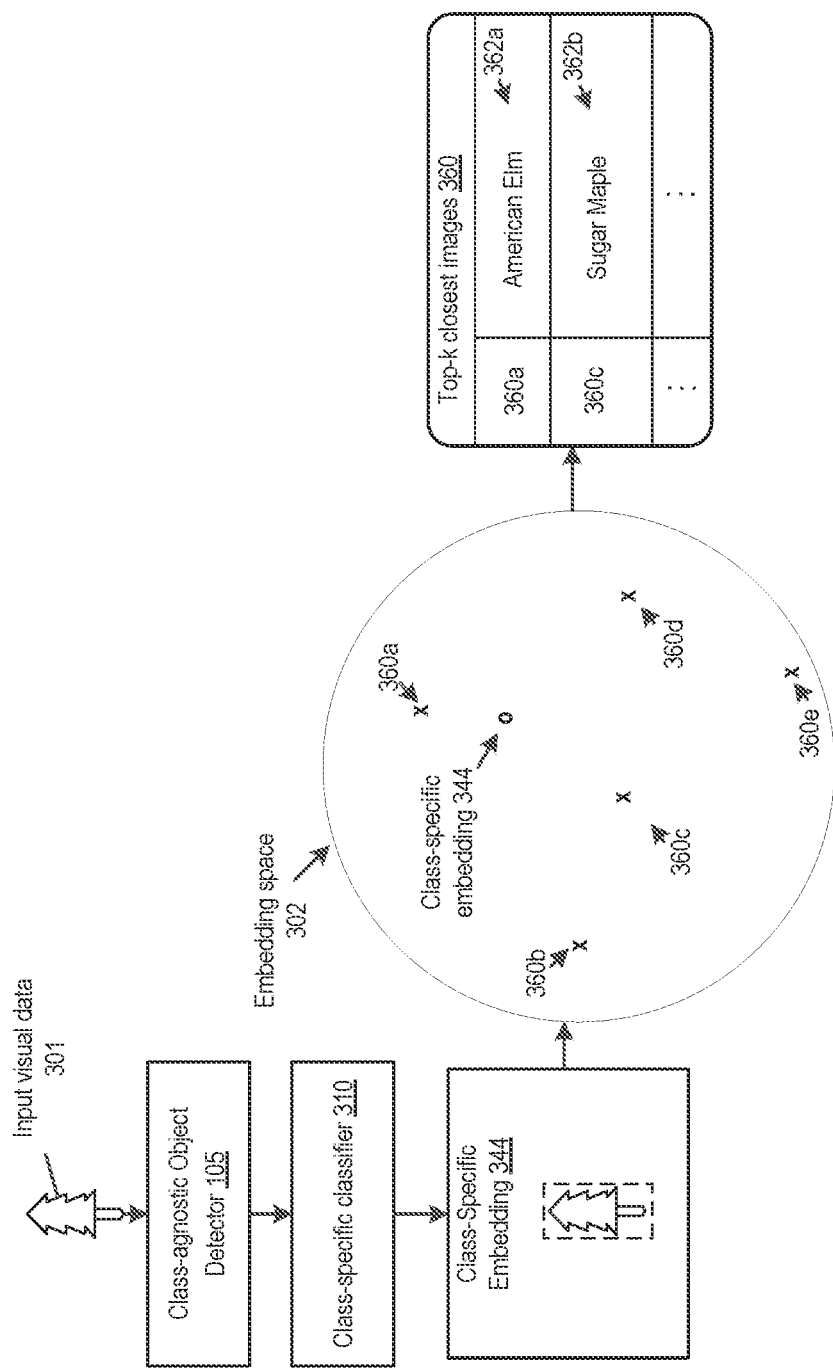
FIG. 3 is a block diagram illustrating use of class-agnostic object detection in visual search, in accordance with various embodiments described herein.

FIG. 3 is a block diagram illustrating use of class-agnostic object detection in visual search, in accordance with various embodiments described herein. Input visual data 301 may be provided to class-agnostic object detector 105. In the example of FIG. 3, the input visual data may be image data representing a tree. The class-agnostic object detector 105 may output data representing a class agnostic object detected in the input visual data 301. For example, class-agnostic object detector 105 may output feature data representing the class-agnostic object (e.g., the tree), a bounding box surrounding the tree, and/or the input visual data 301 annotated with a bounding box and/or segmentation mask. The output of class-agnostic object detector 105 may be provided to a class-aware model 310 that may be trained to detect objects of one or more classes. The class-aware model 310 may be "class-aware" in the sense that the model has been trained using class-specific training samples and/or may be "class-aware" by being a class-discriminative model trained to distinguish between different classes of objects. For example, the class-aware model 310 may be trained to classify different types of trees and/or plants. An embedding may be extracted from the class-aware model 310 (e.g., a class-specific embedding 344 representing the tree of the input visual data 301).

In the example depicted in FIG. 3, the class-specific embedding 344 represents a tree that is represented in a frame of image data. In various examples, the class-specific embedding 344 may include data semantically describing the tree, bounding box (or other location data) identifying the location of pixels of the frame of image data that represent the tree, etc. Class-specific embedding 344 may be generated by the class-aware model 310. Class-specific embedding 344 may be a multi-dimensional feature representation describing the image data in a plurality of different dimensions.

In the example, a user may wish to identify the tree represented by the input visual data 301. Accordingly, a visual search may be performed by generating an embedding representing the tree and comparing the embedding to other embeddings in embedding space 302 that are associated with different types/species of trees.

A semantic retrieval operation may be performed to determine the top-k closest images 360 to the input tree (e.g., represented by embedding 344). The top-k closest images 360 may be selected from historical image data (e.g., saved images of trees labeled with the species/common name of the tree). For example, a search index may be generated and used to compare the current embedding (e.g., embedding 344) to all neighboring embeddings within the embedding space. The search index may be used to find the embedding vectors of embedding space 302 with the largest cosine similarity (or smallest Euclidean distance or other similarity score used to determine a degree of similarity between two embedding vectors). Since the embedding vectors may semantically represent the images of the trees, the cosine similarity (or other similarity metric) may represent the semantic similarity between the two images (e.g., between the appearance of two tree images being compared).

In the example depicted in FIG. 3, the top-k closest images 360 to the input image (e.g., class-specific embedding 344) may be an image of an American Elm (e.g., labeled with the text "American Elm" 362a)) represented by embedding 360a, and the image of a Sugar Maple (e.g., labeled with the text "Sugar Maple" 362b) represented by embedding 360c.

Accordingly, the images may be presented to the user along with the labels indicating the types of tree. Accordingly, the output may be the trees that most closely resemble the input tree represented by class-specific embedding 344, as determined using the visual search procedure described above. This represents one possible use case of the class-agnostic object detector 105 described herein. In this example, the application need not provide any functionality related to detection of an object in image data. Instead, the class-agnostic object, a bounding box, and/or a feature representation of the class-agnostic object may be detected using class-agnostic object detector 105. The output of the class-agnostic object detector 105 may be passed to a classifier specifically trained for classifying objects of the relevant type (in this case, a tree classifier represented by class-aware model 310). A visual search may be performed using the output of the class-aware model 310 to determine the most visually similar objects stored in a database. Although the example in FIG. 3 describes detection of tree images that are similar to a tree detected in an input image, a visual search may instead be used to find similar items (e.g., in a product database or on an e-commerce site), people, animals, and/or other things.

Figure 4:
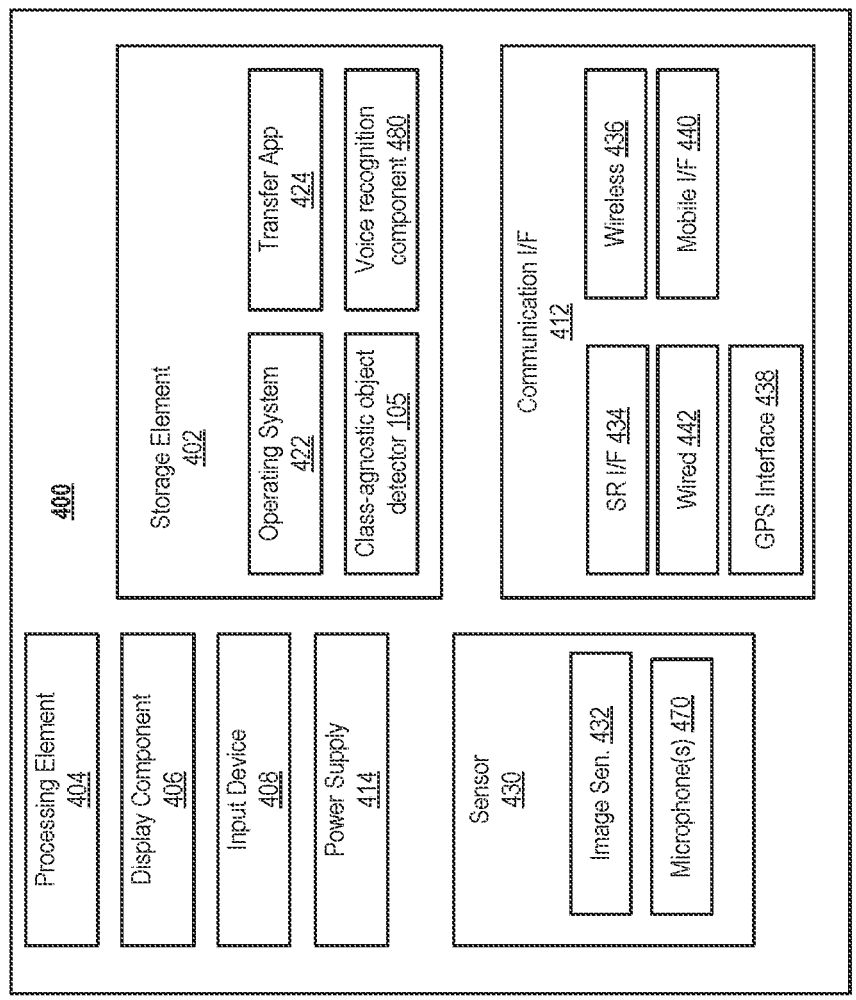
FIG. 4 is a block diagram showing an example architecture of a computing device that may be used in accordance with various embodiments described herein.

FIG. 4 is a block diagram showing an example architecture 400 of a computing device that may be used to implement, at least in part, a class-agnostic object detector 105, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor.

Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may the various models of the class-agnostic object detector 105 that are described herein.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
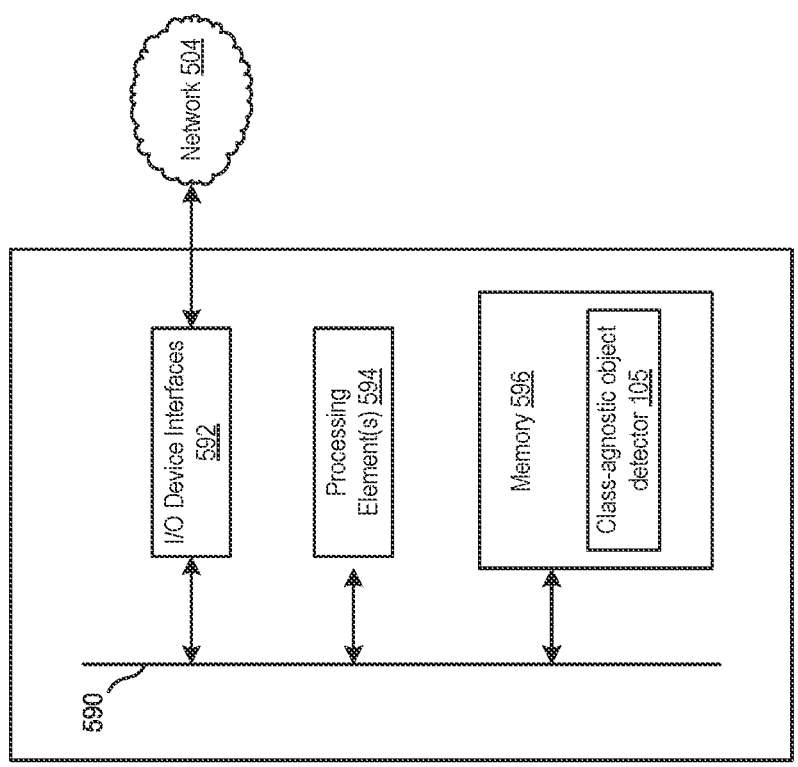
FIG. 5 is a block diagram showing an example architecture of a computing device that may be used in accordance with various embodiments described herein.

FIG. 5 is a block diagram conceptually illustrating example components of a remote device, such as a computing device executing one or more components of the class-agnostic object detector 105 and/or performing various operations downstream from an object detector 105 (e.g., visual search, object classification, etc.). In some other examples, the example components of the remote device depicted in FIG. 5 may execute one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows (described in reference to FIG. 1), when loaded from memory 596. In various further examples, memory 596 may be effective to store instructions effective to program controllers/processors 594 to perform the various techniques described above in reference to FIGS. 1-3. Accordingly, in FIG. 5, class-agnostic object detector 105 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models, and/or the output of the class-agnostic object detector 105 (e.g., class-agnostic object data such as bounding boxes and/or other data identifying the location of class-agnostic objects detected in frames of image data) may be stored and/or cached in memory 596.

Computer instructions for operating each computing device of speech processing system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
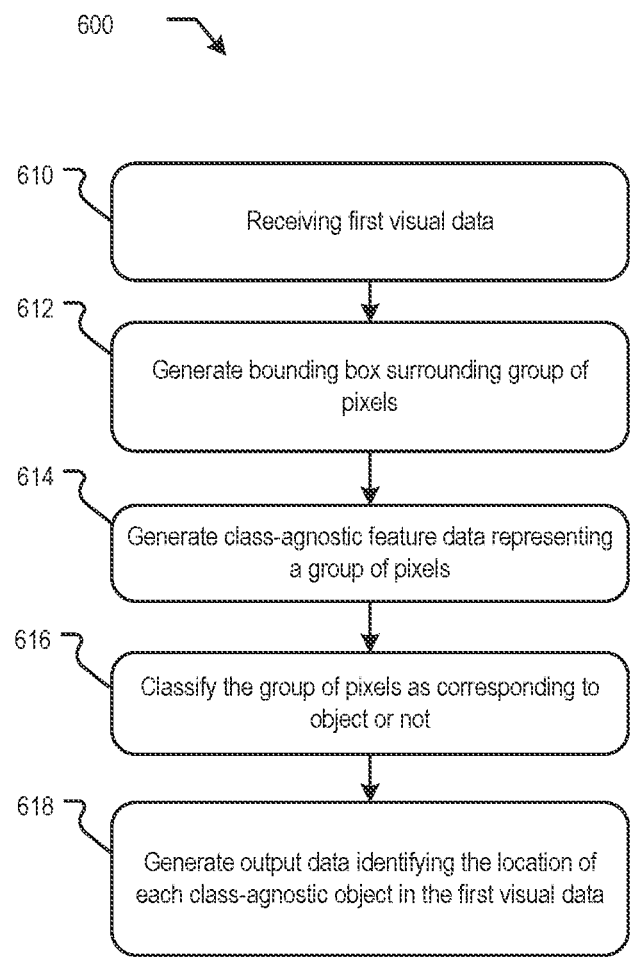
FIG. 6 depicts a flow chart showing an example process for class-agnostic object detection, in accordance with various aspects of the present disclosure.

FIG. 6 depicts a flow chart showing an example process 600 for class-agnostic object detection, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which first visual data may be received. The first visual data may be a frame of image data, such as an individual image captured by a camera and/or received from another device and/or may be a frame of a video. In various other examples, the first visual data may be point cloud data, lidar data, and/or other three-dimensional data representing a three-dimensional space. The first visual data may comprise a two-dimensional grid of pixels with each pixel being associated with a value that affects the color and/or brightness of the pixel's appearance when rendered on a display. The first visual data may represent a physical environment with one or more objects disposed therein. For example, the visual data may represent a user's room, a city street, a group or products, etc.

Processing may continue at action 612, at which a bounding box may be generated that surrounds a group/grouping of pixels (e.g., contiguous pixels). In various examples, the bounding box may be generated using bounding box regression. Bounding box regression predicts the coordinates for a bounding box that bounds pixels representing an object in input visual data. Bounding box regression may be performed from region proposals output by two stage detector 108 or by one stage detector 106.

Processing may continue at action 614, at which class-agnostic feature data representing a group of pixels (e.g., the group of pixels bounded by the bounding box) may be generated. The class-agnostic feature data may be generated using the upstream object detection component 110. As described herein, the upstream object detection component 110 may be trained using bounding box regression loss, object-or-not binary classification loss, and adversarial loss (e.g., loss 122). Loss 122 penalizes the upstream object detection component 110 models when the adversarial object-type discriminator 116 is able to successfully classify an object. This forces the upstream object detection component 110 to learn features that are not useful for object classification, but are instead useful for object detection irrespective of an object's class. Thus, such features are referred to herein as class-agnostic features 140.

Processing may continue at action 616, at which the group of pixels may be classified as either corresponding to an object, or not corresponding to an object. In various examples, the binary "object-or-not" classification may be performed by the object-or-not classification 114 head of the class-agnostic object detector 105. Various implementations of the object-or-not classification 114 head are possible. For example, the object-or-not classification 114 head may be implemented as a feed forward layer and/or as a shallow neural network (e.g., comprising a small number of layers (e.g., <5 layers). However, the particular implementation of the object-or-not classification 114 head may vary according to the desired implementation.

Processing may continue to action 618, at which output data identifying the location of each class-agnostic object in the first visual data may be generated. In various examples, the output data output by the class-agnostic object detector 105 may comprise data representing the locations of each object detected in the input visual data 150. This location data may be in the form of bounding box coordinates (e.g., top left and bottom right x, y coordinates in the 2D pixel plane of the frame of image data), segmentation mask data (delineating a pixel-wise perimeter distinguishing pixels of the object from surrounding pixels that do not pertain to the object), etc. In some examples, each class-agnostic object may be labeled with data indicating that the pixels (e.g., the pixels identified using a bounding box, a segmentation mask, etc.) correspond to an object, but that the object is currently unclassified (e.g., the object is class-agnostic). As described herein, such output data may be used in a variety of downstream use cases. For example, the object detection backbone (e.g., the class-agnostic object detector 105) may be slower and/or more cumbersome to train relative to classifier networks trained to classify particular object classes. Accordingly, it may be relatively simple to use the class-agnostic object data generated by the class-agnostic object detector 105 as inputs to object classification models developed for particular use cases. In some other examples, the class-agnostic object data may be used as an input to a multi-modal NLU and used to determine objects referred to in user speech. In other examples, the class-agnostic object data may be used to perform visual search (e.g., to determine data that is visually similar to a class-agnostic object). These use cases are mentioned by way of example only, and are not intended to be an exhaustive list.

Figure 7:
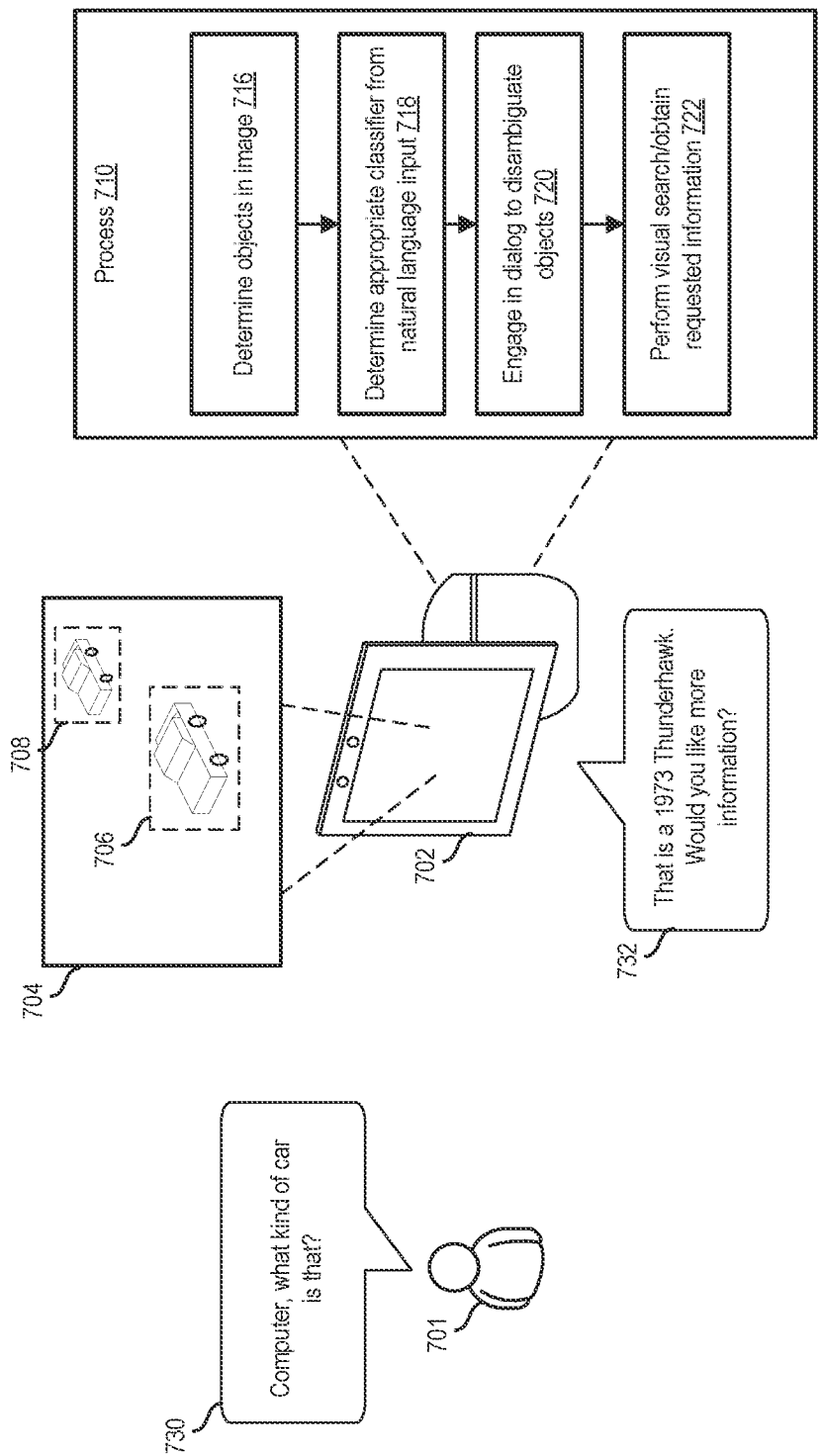
FIG. 7 is an example dialog session between a user and a natural language processing-enabled device, performed according to embodiments of the present disclosure.

FIG. 7 is an example dialog session between a user 701 and a natural language processing-enabled device 702, performed according to embodiments of the present disclosure. In the example, a user may ask a question using natural language input 730, such as "Computer, what kind of car is that?" In the example, a frame of image data 704 may be currently displayed on a display of device 702. In some examples, the frame of image data 704 may be captured by a camera of device 702, while in other examples, the frame of image data 704 may be received from some other source.

In the example, the device 702 may be effective to perform class-agnostic object detection (e.g., using a local class-agnostic object detector 105, a back-end class-agnostic object detector 105, and/or some combination of local and backend processing to implement a class-agnostic object detector 105) to determine class-agnostic objects represented by the frame of image data 704. Accordingly, in process 710, the device 702 may be effective to determine the objects represented in the image at action 716. Actions of process 710 may be performed locally by device 702, by one or more remote, backend devices, and/or by some combination of device 702 and one or more remote, backend devices.

In the example process 710, the device 702 (or some other remote device) may determine the appropriate classifier using the natural language input 730 "Computer, what kind of car is that?" As previously described, in some examples, an NLU process (e.g., a multi-modal NLU process) may receive the natural language input 730, the frame of image data 704, and/or the class-agnostic objects detected in the frame of image data 704. The NLU process may use such input data to determine an appropriate classifier at action 718. For example, if there is only one object detected in the image data, the device 702 may use a classifier specific to that object to determine a class of the object. In the current example, the classifier may be specific to cars based on the user's use of the word "car" in the natural language input 730. In such an example, the NLU process may determine that a car classifier may be appropriate to use based on the user's natural language input 730 including a question about a kind of car.

However, if there are multiple objects detected in the frame of image data 704, process 710 may proceed to action 720 at which a disambiguation process may occur to determine the appropriate object for classification. For example, the device 702 may engage the user in a dialog (e.g., using TTS) to determine to which object the user 701 is referring. For example, the device 702 may display the frame of image data with bounding boxes 706 and 708 drawn around detected class-agnostic objects and may output a question such as "Could you please select the object you are asking about?" In another example, disambiguation may be performed using qualities of the detected class-agnostic objects. For example, the device 702 may output the question, "Do you mean the blue or the red object?" in order to distinguish between a blue object and a red object.

After determining to which object the user is referring using a disambiguation technique, process 710 may proceed to action 722, at which a visual search and/or other search for the desired information may be performed. For example, a process similar to that described in FIG. 3 may be performed to find the closest visual embedding in an embedding space (e.g., a database embeddings representing car images) to the pixels representing the car in the frame of image data 704. For example, the process 710 may determine that the user is referring to the class-agnostic object within bounding box 706. An embedding representing the pixels bounded by the bounding box 706 may be generated (e.g., using a visual feature extractor such as a CNN). The embedding may be used to perform a visual search to determine the closest embedding to the input embedding. Thereafter, data associated with the closest embedding may be output to the user. In the example depicted in FIG. 7, the closest embedding may correspond to a 1973 Thunderhawk car. The device 702 may output the natural language data 732, informing the user 701 "That is a 1973 Thunderhawk. Would you like more information?" The user may request additional information about the car, or not, depending on the user's interest.

Figure 8:
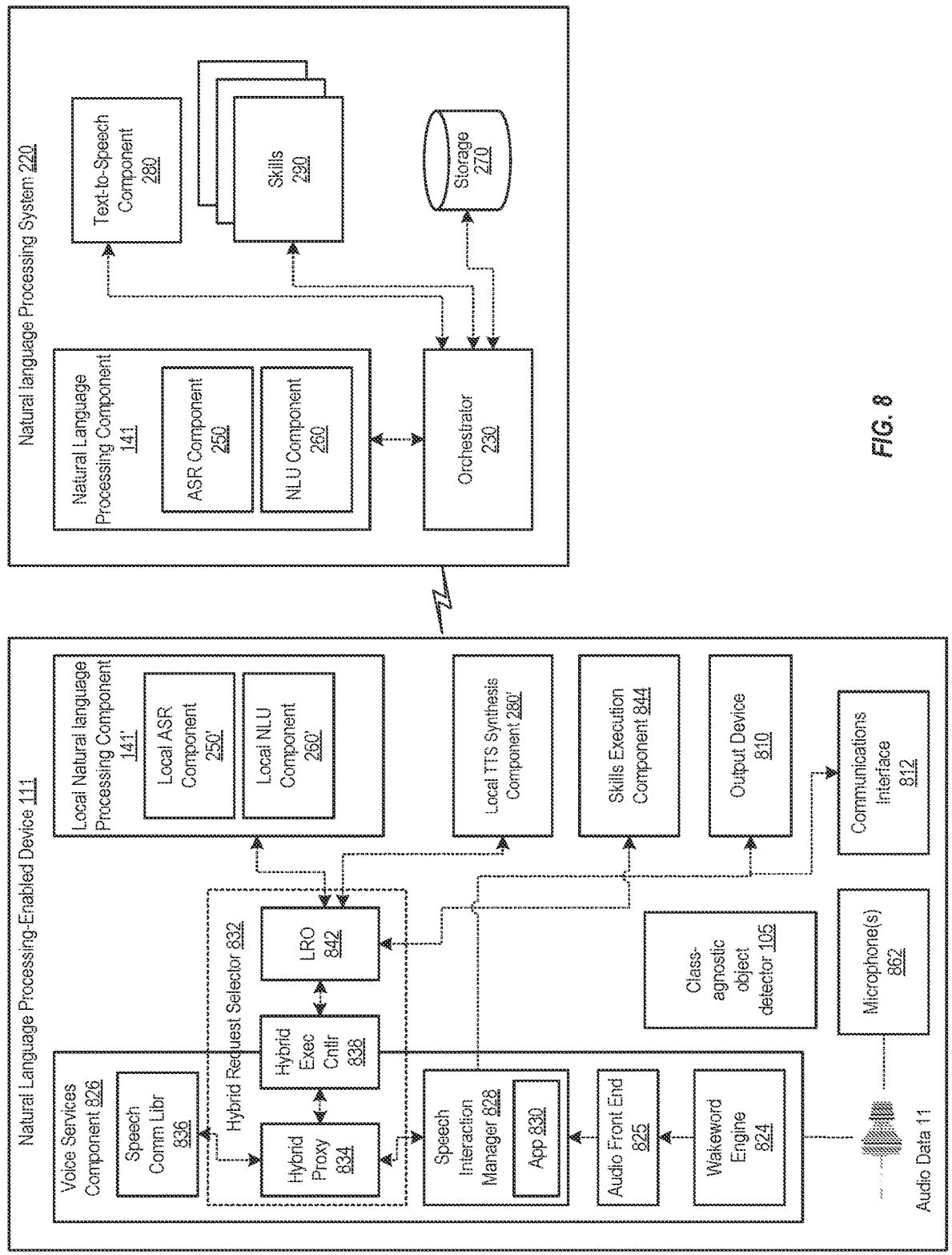
FIG. 8 is a block diagram illustrating a natural language processing-enabled device 111 and a natural language processing system 220, in accordance with embodiments of the present disclosure.

FIG. 8 is a block diagram illustrating a natural language processing-enabled device 111 and a natural language processing system 220, in accordance with embodiments of the present disclosure. In various examples, device 111 may be a natural language processing-enabled device and may include microphones (e.g., far-field microphone arrays) used to transform audio into electrical signals. Natural language processing may then be performed, either locally by the natural language processing-enabled device 111, by one or more other computing devices communicating with the natural language processing-enabled device 111 over a network (e.g., natural language processing system 220), or by some combination of the natural language processing-enabled device 111 and the one or more other computing devices. In various examples, natural language processing-enabled device 111 may include and/or may be configured in communication with output device(s) 810 (e.g., speakers and/or displays) effective to output information obtained in response to a user's spoken request or command, or to output content that may be of interest to one or more users. As used herein, a display of natural language processing-enabled device 111 refers to a display effective to output graphics such as images and/or video. Further, as used herein, a displayless device refers to a device that does not include a display that is effective to render graphical images or text.

In various examples, the device 111 may include the class-agnostic object detector 105 that may be used to receive image data and detect the location of various objects in the image data without classifying such objects. In various examples, this class-agnostic object data may be used by local NLU component 260' and/or by various other local or remote systems to determine an object to which a natural language input is referring. In various examples, having the class-agnostic object detector 105 on the local device (e.g., natural language processing-enabled device 111) may enable quicker object detection relative to sending requests for object detection to some backend system over a network. This low-latency local-processing approach may be critical in certain applications, such as obstacle avoidance in self-driving vehicles. In such examples, the avoidance of objects (no matter what the type of the object is) may be a critical and highly time-sensitive task to be performed with the lowest possible latency.

A natural language processing enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 862 to capture utterances and convert them into digital audio data 11, the natural language processing-enabled device 111 may additionally, or alternatively, receive audio data 11 (e.g., via the communications interface 812) from another device in the environment. In various examples, the natural language processing-enabled device 111 may capture video and/or other image data using a camera. Under normal conditions, the natural language processing-enabled device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the natural language processing-enabled device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 11 from the natural language processing-enabled device 111, to recognize speech in the received audio data 11, and to perform functions in response to the recognized speech. In some embodiments, these functions involve sending a command, from the natural language processing system 220, to the natural language processing-enabled device 111 to cause the natural language processing-enabled device 111 to perform an action, such as output an audible response to the user speech via output device 810 (e.g., one or more loudspeakers). Thus, under normal conditions, when the natural language processing-enabled device 111 is able to communicate with the natural language processing system 220 over a WAN (e.g., the Internet), some or all of the functions capable of being performed by the natural language processing system 220 may be performed by sending a command over a WAN to the natural language processing-enabled device 111, which, in turn, may process the command for performing actions. For example, the natural language processing system 220, via a remote command that is included in remote response data, may instruct the natural language processing-enabled device 111 to output an audible response (e.g., using a local text-to-speech (TTS) synthesis component 280) to a user's question, to output content (e.g., music) via output device 810 (e.g., one or more loudspeakers) of the natural language processing-enabled device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the natural language processing-enabled device 111 may include a local voice services component 826. When a user utterance including the wakeword is captured by the microphone 862 of the natural language processing-enabled device 111, the audio data 11 representing the utterance is received by a wakeword engine 824 of the voice services component 826. The wakeword engine 824 may be configured to compare the audio data 11 to stored models used to detect a wakeword (e.g., "Computer") that indicates to the natural language processing-enabled device 111 that the audio data 11 is to be processed for determining an intent. Thus, the wakeword engine 824 is configured to determine whether a wakeword is detected in the audio data 11, and, if a wakeword is detected, the wakeword engine 824 can proceed with routing the audio data 11 to an audio front end (AFE) 825 (sometimes referred to as an acoustic front end (AFE)) of the voice services component 826. If a wakeword is not detected in the audio data 11, the wakeword engine 824 can refrain from sending the audio data 11 to the AFE 825, thereby preventing the audio data 11 from being further processed. The audio data 11 can be discarded.

The AFE 825 is configured to transform the audio data 11 received from the wakeword engine 824 into data for processing by a suitable ASR component and/or NLU component. The AFE 825 may reduce noise in the audio data 11 and divide the digitized audio data 11 into frames representing a time intervals for which the AFE 825 determines a number of values, called features, representing the qualities of the audio data 11, along with a set of those values, called a feature vector, representing the features/qualities of the audio data 11 within the frame. Many different features may be determined, and each feature represents some quality of the audio data 11 that may be useful for ASR processing and/or NLU processing. A number of approaches may be used by the AFE 825 to process the audio data 11, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 825 is configured to use beamforming data to process the received audio data 11. Beamforming can be used to distinguish between the directions from which speech and noise originate. Accordingly, the microphones 862 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 11, used by the AFE 825 in beamforming, may be determined based on results of the wakeword engine 824's processing of the audio data 11. For example, the wakeword engine 824 may detect the wakeword in the audio data 11 from a first microphone 862 at time, t, while detecting the wakeword in the audio data 11 from a second microphone 862 a millisecond later in time (e.g., time, t+1 millisecond), and so on and so forth, for any suitable number of audio signals corresponding to multiple microphones 862 in a microphone array.

A speech interaction manager (SIM) 828 of the voice services component 826 may receive the audio data 11 that has been processed by the AFE 825. The SIM 828 may manage received audio data 11 by processing request data and non-speech noise or sounds as events, and the SIM 828 may also manage the processing of commands that are used to respond to the user speech or non-speech noise or sounds (e.g., by controlling the action(s) of the natural language processing-enabled device 111). The SIM 828 may include one or more client applications 830 for performing various functions at the natural language processing-enabled device 111.

A hybrid request selector component 832 of the natural language processing-enabled device 111 is shown as including a hybrid proxy component (HP) 834, among other components. The HP 834 can be implemented as a layer within the voice services component 826 that is located between the SIM 828 and a speech communication library (SCL) 836, and may be configured to proxy traffic to/from the natural language processing system 220. For example, the HP 834 may be configured to pass messages between the SIM 828 and the SCL 836 (such as by passing events and instructions there between), and to send messages to/from a hybrid execution controller component (HEC) 838 of the hybrid request selector component 832. For instance, command data received from the natural language processing system 220 can be sent to the HEC 838 using the HP 834, which sits in the path between the SCL 836 and the SIM 828. The HP 834 may also be configured to allow audio data 11 received from the SIM 828 to pass through to the natural language processing system 220 (via the SCL 836) while also receiving (e.g., intercepting) this audio data 11 and sending the received audio data 11 to the HEC 838 (sometimes via an additional SCL).

As will be described in more detail below, the HP 834 and the HEC 838 are configured to perform a handshake procedure to connect to each other. As part of this handshake procedure, the HP 834 and the HEC 838 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 838 determines whether to accept or reject the connection request from the HP 834. If the HEC 838 rejects the HP's 834 connection request, the HEC 838 can provide metadata to the HP 834 that provides a reason why the connection request was rejected.

A local natural language processing component 141' (sometimes referred to as a "natural language processing component," a "spoken language understanding (SLU) component," a "speech engine," or an "engine") is configured to process audio data 11 (e.g., audio data 11 representing user speech, audio data 11 representing non-speech noise or sounds, etc.). In some embodiments, the hybrid request selector component 832 may further include a local request orchestrator component (LRO) 842. The LRO 842 is configured to notify the local natural language processing component 141' about the availability of new audio data 11 that represents user speech, and to otherwise initiate the operations of the local natural language processing component 141' when new audio data 11 becomes available. In general, the hybrid request selector component 832 may control the execution of the local natural language processing component 141', such as by sending "execute" and "terminate" events/instructions to the local natural language processing component 141'. An "execute" event may instruct the local natural language processing component 141' to continue any suspended execution based on audio data 11 (e.g., by instructing the local natural language processing component 141' to execute on a previously-determined intent in order to generate a command). Meanwhile, a "terminate" event may instruct the local natural language processing component 141' to terminate further execution based on the audio data 11, such as when the natural language processing-enabled device 111 receives command data from the natural language processing system 220 and chooses to use that remotely-generated command data.

The LRO 842 may interact with a skills execution component 844 that is configured to receive intent data output from the local natural language processing component 141' and to execute a skill based on the intent.

To illustrate how the natural language processing-enabled device 111 can operate at runtime, consider an example where a user utters an expression, such as "Computer, turn off the kitchen lights." The audio data 11 is received by the wakeword engine 824, which detects the wakeword "Computer," and forwards the audio data 11 to the SIM 828 via the AFE 825 as a result of detecting the wakeword. The SIM 828 may send the audio data 11 to the HP 834, and the HP 834 may allow the audio data 11 to pass through to the natural language processing system 220 (e.g., via the SCL 836), and the HP 834 may also input the audio data 11 to the local natural language processing component 141' by routing the audio data 11 through the HEC 838 of the hybrid request selector 832, whereby the LRO 842 notifies the local natural language processing component 141' of the incoming audio data 11. At this point, the hybrid request selector 832 may wait for response data from the natural language processing system 220 and/or the local natural language processing component 141'.

The local natural language processing component 141' is configured to receive the audio data 11 from the hybrid request selector 832 as input, to recognize speech (and/or non-speech audio events) in the audio data 11, to determine an intent (e.g., user intent) from the recognized speech (or non-speech audio event). This intent can be provided to the skills execution component 844 via the LRO 842, and the skills execution component 844 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 844 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 141' may include an automatic speech recognition (ASR) component 250' that is configured to perform ASR processing on the audio data 11 to convert the audio data 11 into text data (sometimes referred to herein as "ASR text data," an "ASR result", or "ASR data"). ASR transcribes audio data 11 into text data representing the words of the user speech contained in the audio data 11. A spoken utterance in the audio data 11 can be input to the local ASR component 250', which then interprets the utterance based on the similarity between the utterance and pre-established language models available to the local natural language processing component 141'. In some embodiments, the local ASR component 250' outputs the most likely text recognized in the audio data 11, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the natural language processing-enabled device 111 is registered. For instance, the language models (and other data) used by the local ASR component 250' may be based on known information (e.g., preferences) of the user, and/or on a history of previous interactions with the user.

The local natural language processing component 141' may also include a local NLU component 260' that performs NLU processing on the generated ASR text data to determine intent data and/or slot data (referred to herein as a "NLU result", or "NLU data") so that directives may be determined (e.g., by the skills execution component 844) based on the intent data and/or the slot data. Generally, the local NLU component 260' takes textual input (such as text data generated by the local ASR component 250') and attempts to make a semantic interpretation of the ASR text data.

Natural Language Processing System

In other situations, the natural language processing-enabled device 111 may send the audio data 11 to the natural language processing system 220 for processing. As described above, the natural language processing-enabled device 111 may capture audio using the microphone 862, and send audio data 11 (e.g., representing a spoken user request), corresponding to the captured audio, to the natural language processing system 220. The natural language processing-enabled device 111 may include a wakeword detection component that detects when input audio includes a spoken wakeword, and when the wakeword is detected, the audio data 11 is sent by the natural language processing-enabled device 111 to the natural language processing system 220.

Upon receipt by the natural language processing system 220, the audio data 11 may be sent to an orchestrator component 230. The orchestrator component 230 may include memory and logic that enables the orchestrator component 230 to send various pieces and forms of data to various components of the system.

Similar to the operation described above with respect to the local natural language processing component 141' of the natural language processing-enabled device 111, the orchestrator component 230 may send the audio data 11 to a natural language processing component 141. An ASR component 250 of the natural language processing component 141 transcribes the audio data 11 into one or more hypotheses representing speech contained in the audio data 11. The natural language processing component 141 interprets the speech in the audio data based on a similarity between the characteristics of the audio data corresponding to the speech and pre-established language models. For example, the natural language processing component 141 may compare the audio data 11 with models for sounds (e.g., subword units such as phonemes) and sequences of sounds to identify words that match the sequence of sounds in the speech represented in the audio data 11. The natural language processing component 141 may send text data generated thereby to an NLU component 260 of the natural language processing component 141. The text data output by the natural language processing component 141 may include a top scoring hypothesis of the speech represented in the audio data 11 or may include an N-best list including a group of hypotheses of the speech represented in the audio data 11, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by [Musical Artist]", the NLU component 260 may determine the user intended to invoke a music playback intent to play the identified album.

The natural language processing system 220 may include a non-transitory computer-readable memory storage 270, storing various instructions for operation of the natural language processing system 220.

As described above, the natural language processing system 220 may include one or more skill components 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the natural language processing-enabled device 111 described herein may be implemented in software, hardware, firmware, or some combination thereof.

The natural language processing system 220 may reside on natural language processing-enabled device 111, in a cloud computing environment, or some combination thereof. For example, the natural language processing-enabled device 111 may include computing equipment, some portion of which is configured with some or all of the components or functionality of natural language processing system 220 and another portion of which is configured with some or all of the components or functionality of computing device(s) used in natural language processing system 220. The natural language processing-enabled device 111 may then perform a variety of functions on its own (such as when remote communications are unavailable), and/or may communicate (when capable) with computing device(s) and/or the natural language processing system 220 to perform other functions. Alternatively, all of the functionality may reside on the natural language processing-enabled device 111 or remotely.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
receiving a first frame of image data;
generating, by a first object detection component, first data identifying a first plurality of pixels of the first frame of image data;
generating second data representing class-agnostic features of the first plurality of pixels;
determining, by the first object detection component using the second data, that the first plurality of pixels corresponds to an object represented in the first frame of image data;
receiving a natural language input referring to the object, the natural language input representing a request to perform a first action related to the object;
receiving the second data by a natural language understanding component;
determining, by the natural language understanding component that the natural language input corresponds to the second data; and
performing the first action related to the object.

2. The method of claim 1, further comprising:
sending the first data to a discriminator component;
sending the second data to the discriminator component;
generating, by the discriminator component, a prediction of a class of the object;
determining that the prediction of the class of the object corresponds to ground truth data indicating the class of the object;
sending feedback data from the discriminator component to the first object detection component, the feedback data indicating that the discriminator component correctly predicted the class of the object; and
generating third data representing different class-agnostic features of the first plurality of pixels, wherein the third data is different from the second data.

3. The method of claim 1, wherein the object is a first object, the method further comprising:
determining, by the first object detection component, that a second plurality of pixels corresponds to a second object represented in the first frame of image data;
generating third data representing second class-agnostic features of the second plurality of pixels;
determining, by the first object detection component using the third data, that the second plurality of pixels corresponds to the second object;
receiving a natural language input; and
determining that the natural language input refers to the first object based at least in part on a correspondence between the natural language input and the second data.

4. A method comprising:
receiving a first frame of image data comprising a first plurality of pixels;
generating first data using the first frame of image data, the first data representing at least one class-agnostic feature of a first object;
receiving a natural language input referring to the first object;
receiving, by a first component, the first data;
determining, by the first component using the first data, that the first plurality of pixels corresponds to the first object represented in the first frame of image data based at least in part on the natural language input and the first data; and
generating second data indicating that the first plurality of pixels in the first frame of image data includes a representation of the first object.

5. The method of claim 4, further comprising:
sending the first data to a discriminator component; and
generating, by the discriminator component, a prediction of a first class of the first object.

6. The method of claim 5, further comprising:
determining that the prediction of the first class corresponds to label data indicating a class of the first object; and
generating modified first data representing the first plurality of pixels based at least in part on the prediction corresponding to the label data.

7. The method of claim 4, further comprising:
generating third data comprising a first region proposal for a first grouping of pixels of the first plurality of pixels;
generating fourth data comprising a second region proposal for a second grouping of pixels of the first plurality of pixels;
generating fifth data representing at least one class-agnostic feature of the third data;
generating sixth data representing at least one class-agnostic feature of the fourth data; and
determining by the first component using the fifth data, that the first grouping of pixels corresponds to a second object represented in the first frame of image data.

8. The method of claim 4, further comprising:
sending the second data to an object classifier component;
sending the first frame of image data to the object classifier component; and
determining, by the object classifier component, a first class of the first object based at least in part on the second data and the first frame of image data.

9. The method of claim 4, further comprising:
generating third data representing a first group of pixels of the first frame of image data; and
generating, using a second component, a first binary prediction for the first group of pixels indicating whether the first group of pixels corresponds to an arbitrary object.

10. The method of claim 4, further comprising:
generating a first embedding representing the first object;
determining a second embedding by searching an embedding space using the first embedding;
determining an item associated with the second embedding in a database; and
generating output data related to the item.

11. A system comprising:
at least one processor; and
non-transitory computer-readable memory storing instructions that, when executed by the at least one processor, are effective to:
receive a first frame of image data comprising a first plurality of pixels;
generate first data using the first frame of image data, the first data representing at least one class-agnostic feature of a first object;

receive a natural language input referring to the first object;

receiving, by a first component, the first data;

determine, by the first component using the first data, that the first plurality of pixels corresponds to the first object represented in the first frame of image data based at least in part on the natural language input and the first data; and generate second data indicating that the first plurality of pixels in the first frame of image data includes a representation of the first object.

12. The system of claim 11, the non-transitory computer-readable memory storing further instructions that, when executed by the at least one processor, are further effective to:

send the first data to a discriminator component; and generate, by the discriminator component, a prediction of a first class of the first object.

13. The system of claim 12, the non-transitory computer-readable memory storing further instructions that, when executed by the at least one processor, are further effective to:

determine that the prediction of the first class corresponds to label data indicating a class of the first object; and generate modified first data representing the first plurality of pixels based at least in part on the prediction corresponding to the label data.

14. The system of claim 11, the non-transitory computer-readable memory storing further instructions that, when executed by the at least one processor, are further effective to:

generate third data comprising a first region proposal for a first grouping of pixels of the first plurality of pixels;

generate fourth data comprising a second region proposal for a second grouping of pixels of the first plurality of pixels;

generate fifth data representing at least one class-agnostic feature of the third data;

generate sixth data representing at least one class-agnostic feature of the fourth data; and determine by the first component using the fifth data, that the first grouping of pixels corresponds to a second object represented in the first frame of image data.

15. The system of claim 11, the non-transitory computer-readable memory storing further instructions that, when executed by the at least one processor, are further effective to:

send the second data to an object classifier component;

send the first frame of image data to the object classifier component; and determine, by the object classifier component, a first class of the first object based at least in part on the second data and the first frame of image data.

16. The system of claim 11, the non-transitory computer-readable memory storing further instructions that, when executed by the at least one processor, are further effective to:

generate third data representing a first group of pixels of the first frame of image data; and generate, using a second component, a first binary prediction for the first group of pixels indicating whether the first group of pixels corresponds to an arbitrary object.

17. The system of claim 11, the non-transitory computer-readable memory storing further instructions that, when executed by the at least one processor, are further effective to:

generate a first embedding representing the first object;

determine a second embedding by searching an embedding space using the first embedding;

determine an item associated with the second embedding in a database; and generate output data related to the item.

* * * * *